US008854303B1

(12) United States Patent
Cho et al.

(10) Patent No.: US 8,854,303 B1
(45) Date of Patent: Oct. 7, 2014

(54) DISPLAY DEVICE AND CONTROL METHOD THEREOF

(71) Applicant: LG Electronics Inc., Seoul (KR)

(72) Inventors: Eunhyung Cho, Seoul (KR); Sinae Chun, Seoul (KR); Jihwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/084,862

(22) Filed: Nov. 20, 2013

Related U.S. Application Data

(60) Provisional application No. 61/805,499, filed on Mar. 26, 2013.

(30) Foreign Application Priority Data

Sep. 2, 2013 (KR) .......................... 10-2013-0105042

(51) Int. Cl.
  *G09G 5/00* (2006.01)
  *G06F 3/01* (2006.01)
(52) U.S. Cl.
  CPC .................................... *G06F 3/013* (2013.01)
  USPC ......................................................... 345/156
(58) Field of Classification Search
  CPC .......... G06F 2203/04104; G06F 3/005; G06F 3/012; G06F 3/013; G06F 3/041; G06F 3/0412; G06F 3/0425; G06F 3/0488; G06F 3/011; G06F 3/017; G02B 27/0093; G02B 27/01; G06T 7/00; G06T 11/00; G06K 9/00597; A61B 3/00; A61B 3/113
  USPC .......... 345/156–178; 178/18.01–18.09, 18.11
  See application file for complete search history.

(56) References Cited

U.S. PATENT DOCUMENTS

| 8,261,090 | B1 | 9/2012 | Matsuoka |
| 8,345,143 | B2 | 1/2013 | Yoshino |
| 2002/0023133 | A1* | 2/2002 | Kato et al. .................... 709/205 |
| 2005/0289363 | A1 | 12/2005 | Tsirkel et al. |
| 2006/0109237 | A1* | 5/2006 | Morita et al. ................. 345/156 |
| 2006/0262104 | A1* | 11/2006 | Sullivan et al. ............... 345/177 |
| 2010/0205667 | A1 | 8/2010 | Anderson et al. |
| 2011/0252256 | A1* | 10/2011 | Morris ......................... 713/323 |
| 2012/0235790 | A1 | 9/2012 | Zhao et al. |
| 2012/0235901 | A1* | 9/2012 | Binder .......................... 345/156 |
| 2012/0278031 | A1* | 11/2012 | Oda et al. ..................... 702/150 |
| 2012/0295708 | A1 | 11/2012 | Hernandez-Abrego et al. |
| 2013/0201104 | A1* | 8/2013 | Ptucha et al. ................. 345/158 |
| 2013/0283213 | A1* | 10/2013 | Guendelman et al. ........ 715/848 |

* cited by examiner

*Primary Examiner* — Stephen Sherman
(74) *Attorney, Agent, or Firm* — Birch, Stewart, Kolasch & Birch, LLP

(57) ABSTRACT

A display device is disclosed. A display device according to an embodiment of the present specification includes a display unit configured to display visual information, a camera unit configured to capture an image in front of the display device, a sensor unit configured to sense user input applied to the display device, and a control unit configured to control the display device, wherein the control unit detects at least one user from the captured image, maintains display of the visual information and processes received user input when the detected user includes a predetermined master user, the control unit detects at least one user from the captured image, maintains display of the visual information and does not process the received user input when the detected user does not include the predetermined master user, and the control unit deactivates the display unit when no user is detected in the captured image.

19 Claims, 9 Drawing Sheets

FIG. 5

| User | Master + User | Master | User | No user |
|---|---|---|---|---|
| Screen | ○ | ○ | ○ | ✕ |
| Touch | ○ | ✕ | ○ | ✕ |

# DISPLAY DEVICE AND CONTROL METHOD THEREOF

This application claims the benefit of U.S. Provisional Application No. 61/805,499, filed on Mar. 26, 2013 and Korean Patent Application No. 10-2013-0105042, filed on Sep. 2, 2013, which are hereby incorporated by reference as if fully set forth herein.

BACKGROUND OF THE INVENTION

1. Field of the Invention

The present specification relates to a display device and, more specifically, to a method for controlling a display and user input of a display device. The present specification proposes a method for maintaining a display or processing user input according to a user who controls a display device when the display device displays visual information.

2. Discussion of the Related Art

A display device provides various functions in addition to a general function of displaying visual information. For example, a display device such as a smartphone, a tablet PC or a notebook computer can not only display visual information but also transmit/receive data using various network protocols and receive a user input through a display unit. Accordingly, current display devices are no longer simple display devices, instead functioning as a smart device enabling user interaction.

SUMMARY OF THE INVENTION

Various types of display devices have mobility. Portable display devices having mobility have become light and compact for user convenience. These display devices have batteries with limited capacity because of light and compact structures thereof, and thus power control of the display devices has become a very important issue.

Furthermore, a display device having mobility can be easily moved among a plurality of users and simultaneously used by a plurality of users owing to its large screen. Accordingly, a display device control method considering power consumption for a plurality of users becomes important.

A display device according to an embodiment of the present specification includes: a display unit configured to display visual information; a camera unit configured to capture an image in front of the display device; a sensor unit configured to sense user input applied to the display device; and a control unit configured to control the display device, wherein the control unit detects at least one user from the captured image, maintains display of the visual information and processes received user input when the detected user includes a predetermined master user, wherein the control unit detects at least one user from the captured image, maintains display of the visual information and does not process the received user input when the detected user does not include the predetermined master user, wherein the control unit deactivates the display unit when no user is detected in the captured image.

In another aspect of the present invention, a method for controlling a display and user input of a display device includes: displaying visual information; and detecting at least one user from an image captured in front of the display device, wherein, when the at least one user is detected, display of the visual information is maintained and received user input is processed when al least one user includes a predetermined master user, wherein display of the visual information is maintained and the received user input is not processed when the detected user does not include the predetermined master user, wherein a display unit is deactivated when no user is detected from the captured image.

The display device according to the present specification can provide a user-friendly user experience (UX). Furthermore, the display device according to the present specification can reduce power consumption by maintaining or turning off a display according to whether or not a user uses the display. In addition, the display device according to the present specification can improve security of the device by processing or ignoring user input according to device user. Moreover, the display device according to the present specification can optimize power consumption, security and user convenience by detecting a user who uses the display and determining whether or not to process the display and user input on a user dependent basis. In addition, the display device according to the present specification can decrease power consumption while providing a correct and user-friendly UX by controlling a display and a user input according to user and presence or absence of a point of gaze of the user on the display device.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a table illustrating a method for controlling a display and a user input of a display device according to an embodiment of the present specification;

DETAILED DESCRIPTION OF THE INVENTION

Although the terms used in the present invention are selected from generally known and used terms, the terms may be changed according to the intention of an operator, customs, or the advent of new technology. Some of the terms mentioned in the description of the present invention have been selected by the applicant at his or her discretion, the detailed meanings of which are described in relevant parts of the description herein. Therefore, the present invention must be understood, not simply by the actual terms used but by the meanings of each term.

Figure 1:
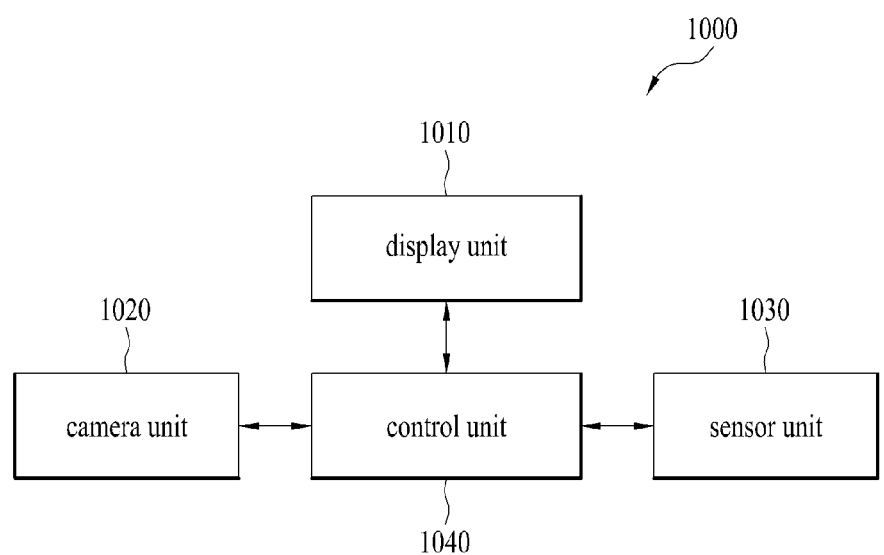
FIG. 1 is a block diagram of a display device according to an embodiment of the present specification.

FIG. 1 is a block diagram of a display device 1000 according to an embodiment of the present specification.

In the present specification, the display device 1000 refers to a digital device displaying visual information and receiving user input to operate according thereto. For example, the display device 1000 may include a smartphone, a personal digital assistant (PDA), a notebook computer, a tablet PC, a head mounted display (HMD), a head up display (HUD), a smart watch, etc.

The display device 1000 may include a display unit 1010, a camera unit 1020, a sensor unit 1030 and a control unit 1040.

The display unit 1010 may display visual information processed by the display device 1000. The visual information may include various images such as a still image, a moving image, text, etc. In the present specification, displaying visual information may refer to display of content.

The camera unit 1020 may acquire an image of a view angle area of a camera. According to one embodiment, the camera unit 1020 may be provided to the front of the display device 1000 to acquire an image of an area in front of the display device 1000. The camera unit 1020 may acquire an image of an area in front of the display device 1000 under the control of the control unit 1040 and transmit the acquired image or data on the acquired image to the control unit 1040.

The sensor unit 1030 may sense at least one of user input applied to the display device 1000 and the environment of the display device 1000 and provide a sensing result to the control unit 1040. In the present specification, the sensor unit 1030 may correspond to or include various types of sensors sensing at least one of user input and the environment of the display device 1000. The sensor unit 1030 may include a gravity sensor, a geomagnetic sensor, a gyro sensor, an acceleration sensor, an inclination sensor, a brightness sensor, an altitude sensor, an odor sensor, a temperature sensor, a depth sensor, a pressure sensor, a bending sensor, an audio sensor, a video sensor, a global positioning system (GPS) sensor, a touch sensor, a mechanical vibration sensor, etc. or correspond to at least one thereof. The sensor unit 1030 commonly refers to the above-described various sensing means and can sense various user inputs and user environments and provide a sensing result such that the display device can operate according to the sensing result. The above-mentioned sensors may be included in the display device as separate elements or integrated into at least one element and included in the display device.

The display device 1000 may include a storage unit (not shown). The storage unit may store data processed by the display device 1000. That is, the storage unit refers to a medium in which data is stored or temporarily stored by the display device 1000 or data is buffered by the display device 1000.

The display device 1000 may include a power unit (not shown). The power unit refers to a device such as a battery providing power to the display device 1000.

In the following, the display device may be called a device for convenience of description.

The display function of the device requires high power consumption. Accordingly, the device can turn off the display in order to improve power efficiency. For example, when the user does not use the display, the device can detect the same and automatically turn off the display. In the present specification, "turning off the display" refers to "stopping display of visual information on the display unit" or "cutting off power supply to the display unit" . . . . In the following description, "turning off the display" may be replaced by "turning off a display screen or screen". Furthermore, "turning off the display" may be replaced by "deactivating the display unit" . . . .

The device recognizes user input through the sensor unit and performs an operation in response to the user input. However, if the device operates according to user input when plural users use the device or a user who is not the owner of the device uses the device, personal information stored in the device may be exposed.

Accordingly, the present specification proposes a method for detecting a user who uses the device and controlling a display and user input according to the detection result.

Figure 2:
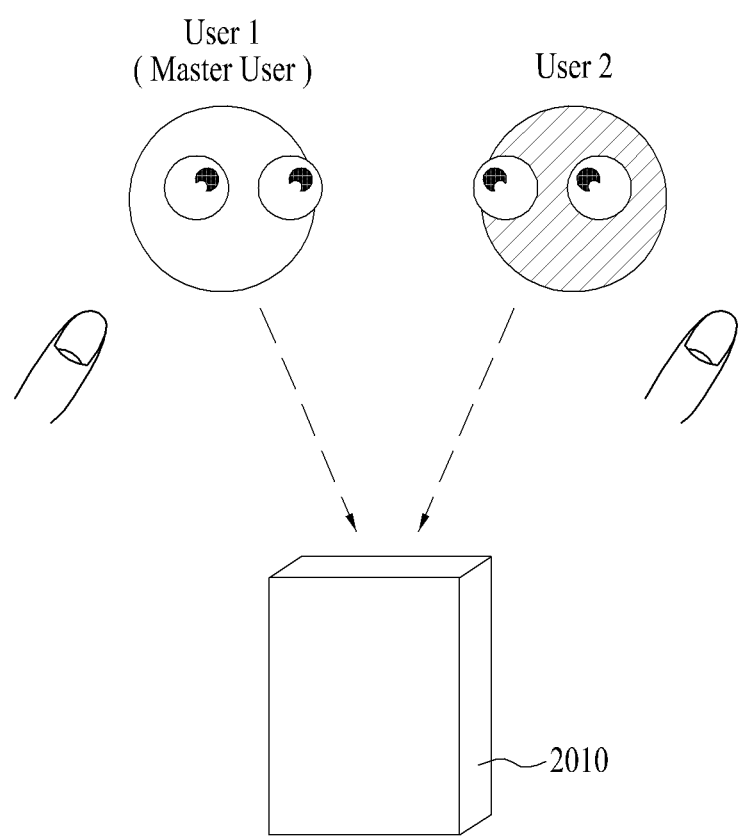
FIG. 2 illustrates a method for controlling a display and a user input of a display device according to an embodiment of the present specification.

FIG. 2 illustrates a method for controlling a display and user input of a display device according to an embodiment of the present specification.

FIG. 2 illustrates a case in which a first user User 1 and a second user User 2 use a device 2010 together. The first user User 1 is the owner of the device 2010 and is called a master user in the following description. The master user refers to a user whose identification information is stored in the device. The master user may refer to a user given permission to use the device according to the identification information. The second user refers to a user other than the master user. However, the second user may refer to a user whose identification information is not stored in the device 2010 or a user determined as a user other than the master user according to identification information. In the following description, a user who is not the master user may be called a normal user or the second user.

In the present specification, the master user may refer to a user having permission to use the device 2010 and thus can control a display and user input. The normal user may refer to a user who has no permission to use the device 2010 or has partial permission to use the device 2010. The normal user can use the device but cannot control all functions of the device by applying user input.

FIG. 2 illustrates a case in which the master user and the second user use the device 2010 together. In this case, since plural users use the device 2010, the device 2010 may maintain display and operate according to user input applied thereto.

The device 2010 may detect presence of a user who is using the device 2010 using the camera unit provided to the front thereof and identify the user using user identification information when the user is present. The device 2010 may check whether or not a user is present by acquiring an image of an area in front of the device at a predetermined interval. According to one embodiment, the device 2010 can recognize presence of a user in the acquired image using various image processing techniques. For example, the device 2010 can determine whether or not a user is present or whether or not the user uses the device according to whether or not the area of a user or user face, included in the acquired image, exceeds a predetermined reference value. Otherwise, when a user is present, the device 2010 may determine whether or not the user is using the device by detecting the point of gaze of the user. The device 2010 may detect a user or a user image by capturing an image in front thereof at a predetermined interval or when a predetermined event is generated.

As described above, since the device 2010 stores personal information, the device 2010 can protect the personal information by preventing a user other than the master user from using the device. Furthermore, the device 2010 can minimize power consumption by turning off the display unit when the display unit of the device 2010 is not used.

In addition, the device 2010 may determine whether or not a received user input is processed according to detected user. That is, when a predetermined user, that is, the master user is not detected, the device 2010 does not process received user input so as to prevent a user other than the master user from controlling the device, thereby improving security . . . . That is, the device 2010 may deactivate the sensor unit for sensing the received user input or ignore or bypass the user input received from the sensor unit. Furthermore, the device 2010 may store the received user input instead of processing the same.

In the following description, touch input may be exemplified as user input. However, the user input is not limited to touch input. User input refers to input recognizable by the device using the sensor unit. User inputs include various inputs for controlling the device, recognizable by the device, such as a touch input, a hovering input, a gesture input, an audio input, a point of gaze input, etc.

A description will be given of operations of the device 2010.

Figure 3:
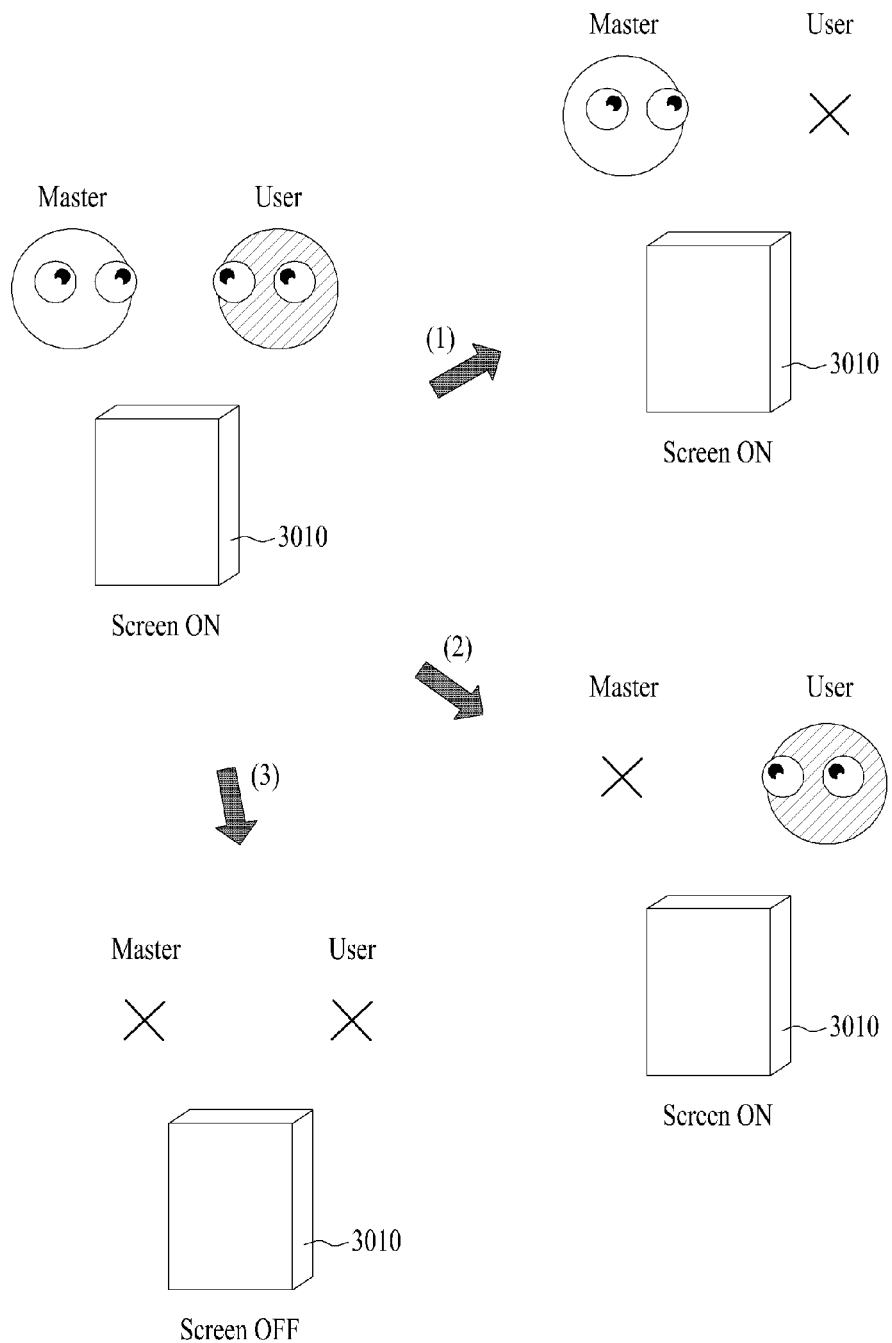
FIG. 3 illustrates a method for controlling a display of a display device according to an embodiment of the present specification.

FIG. 3 illustrates a method for controlling a display of a display device according to an embodiment of the present specification.

FIG. 3 illustrates a method for maintaining or turning off a display according to user. In FIG. 3, an operation of maintaining a display is represented as "screen ON" and an operation of turning off the display is represented as "screen OFF".

In FIG. 3, (1) shows a case in which only the master user located in front of the device 3010 is detected, (2) shows a case in which only the normal user located in front of the device 3010 is detected and (3) shows a case in which no user is detected in front of the device 3010.

The upper part of the left of FIG. 3 shows a case in which both the master user and normal user are detected as shown in FIG. 2. In this case, the device 3010 can maintain the display instead of turning off the same since the master user is detected. It can be assumed that, after detection of the master user and the normal user as shown in FIG. 2, the state is changed to (1), (2) and (3) of FIG. 3.

In case (1) in which only the master user located in front of the device is detected, the device can maintain the display instead of turning off the same since the master user is a registered user having permission to use the device, as described above.

In case (2) in which only the normal user located in front of the device is detected, the device can maintain display instead of turning off the display because there is no problem in terms of the security of the device even if the normal user views visual information that has been viewed by the master user and the normal user together.

Even in this case, however, the device may turn off the display if the master user is not detected for a predetermined time or longer and only the normal user is detected. This is because information that is not predicted by the master user may be displayed after lapse of a predetermined time. The predetermined time may be changed according to device setting or determined according to visual information type. For example, in the case of a video having a long runtime, security is less threatened even when the device displays the video in the absence of the master user. However, when still images or text is automatically page-turned, security may be threatened if display of the still images or texts is maintained. Accordingly, the predetermined time is set to a relatively long period in the case of a video having a long runtime and set to a relatively short period in the case of a video having a short runtime or sequential display of a plurality of images.

In case (3) in which no user is detected in front of the device, the device may turn off the display because there is no need to maintain the display. The device may turn off the display after a predetermined lapse of time from when a user is not detected. Furthermore, the device may detect a user one more time after a predetermined lapse of time and turn off the display when no user is detected. The predetermined time may be changed according to user setting or the type of displayed visual information.

Figure 4:
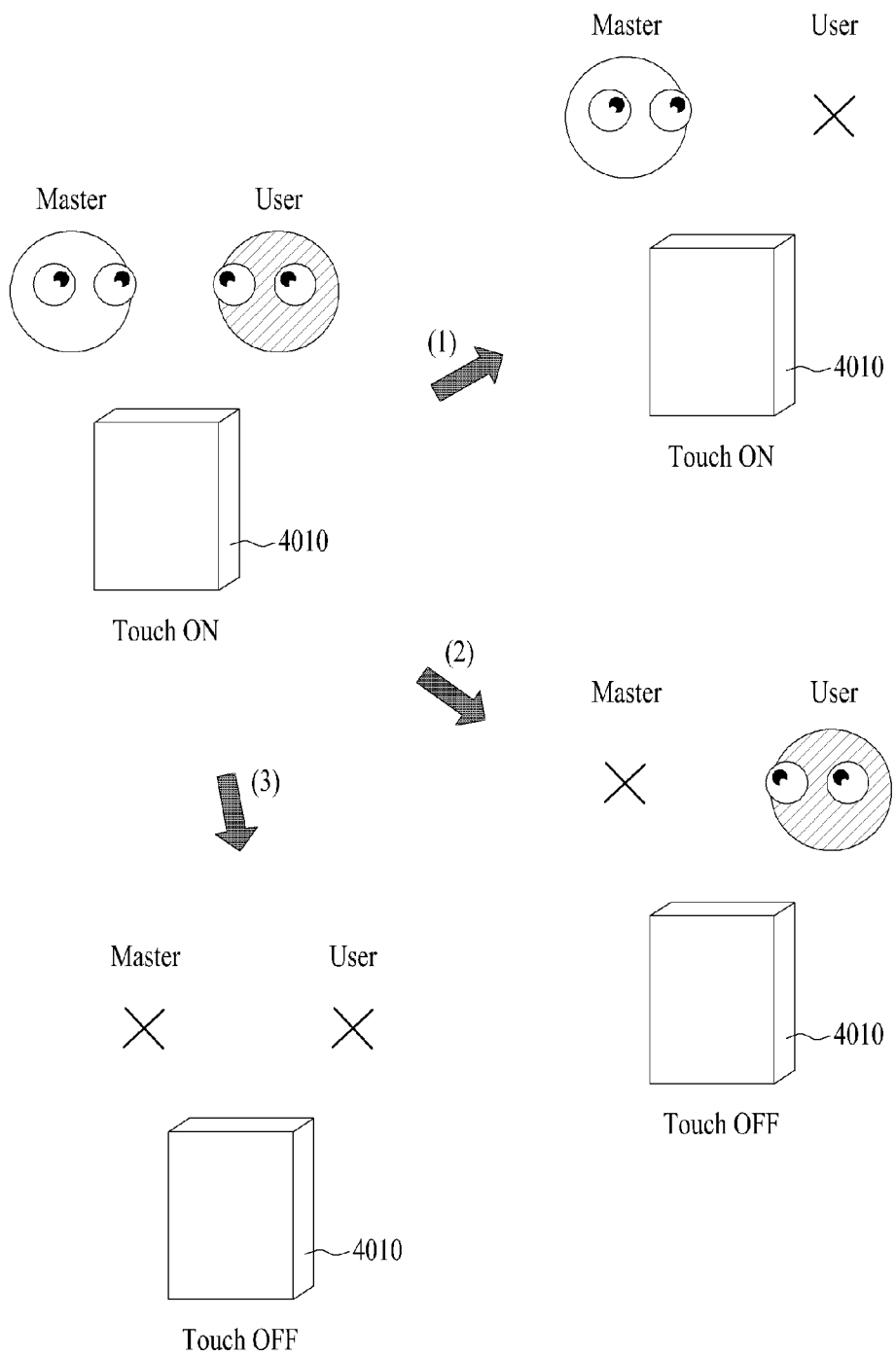
FIG. 4 illustrates a method for controlling user input of a display device according to an embodiment of the present specification.

FIG. 4 illustrates a method for controlling user input of a display device according to an embodiment of the present specification.

FIG. 4 illustrates a method for processing or ignoring/bypassing user input according to user who uses a device 4010. In FIG. 4, a case in which the user input is a touch input and is processed is represented as "touch ON" and a case in which the user input is not processed is represented as "touch OFF" . . . . However, the user input is not limited to the touch input and may correspond to various user inputs that can be recognized and received by the device using sensors, as described above. In the following, touch input or user input is used.

In FIG. 4, (1) shows a case in which only the master user located in front of the device 4010 is detected, (2) shows a case in which only the normal user located in front of the device 4010 is detected and (3) shows a case in which no user is detected in front of the device 4010.

The upper part of the left of FIG. 4 shows a case in which both the master user and normal user are detected as shown in FIG. 2. In this case, the device 4010 can process a received user input and perform an operation according thereto since the master user is detected. It can be assumed that, after detection of the master user and the normal user as shown in FIG. 2, the state is changed to (1), (2) and (3) of FIG. 4.

In case (1) in which only the master user located in front of the device is detected, the device can process the received user input and operate according thereto since the master user is a registered user having permission to use the device.

In case (2) in which only the normal user located in front of the device is detected, the device may not process the received user input because permission of the normal user to control the device in the absence of the master user may threaten security although maintaining display of visual information viewed by the master user and the normal user together does not pose a serious security threat.

In case (3) in which no user is detected in front of the device, the device may not process the user input. In this case, however, the device can determine whether or not to process the user input according to user input type.

As described above with reference to FIG. 3, when no user is detected in front of the device, the device can turn off the display and enter a lock state. The lock state refers to a state in which the device turns off the display and does not recognize user inputs other than user input for cancelling the lock state to minimize power consumption when the device is not in use. In this case, the device can process the user input for cancelling the lock state to turn on the display and enter user input standby state.

FIG. 5 is a table illustrating the method for controlling a display and user input of the display device according to an embodiment of the present specification.

The table of FIG. 5 shows the operations of the device, described above with reference to FIGS. 2, 3 and 4. As described above, the device can detect whether or not a user is present in front of the device using the camera unit and identify the user when the user is detected. Results of detection and identification of a user by the device may be categorized into 1) a case in which the master user and the normal user are detected, 2) a case in which the normal user is detected, 3) a case in which the master user is detected and 4) a case in which no user is detected.

In case 1) in which the master user and the normal user are detected, the device can maintain display (screen O) and process received user input (touch O). In case 2) in which only the normal user is detected, the device can maintain the display (screen O) and ignore the received user input (touch X). In case 3) in which only the master user is detected, the device can maintain the display (screen O) and process the received user input (touch O). In case 4) in which no user is detected, the device turns off the display (screen X) and ignores the received user input (touch X). In case 4), the device can turn off the display and enter the lock state. Here, when the received user input corresponds to user input for cancelling the lock state, the device can process the user input to exit the lock state, as described.

Figure 6:
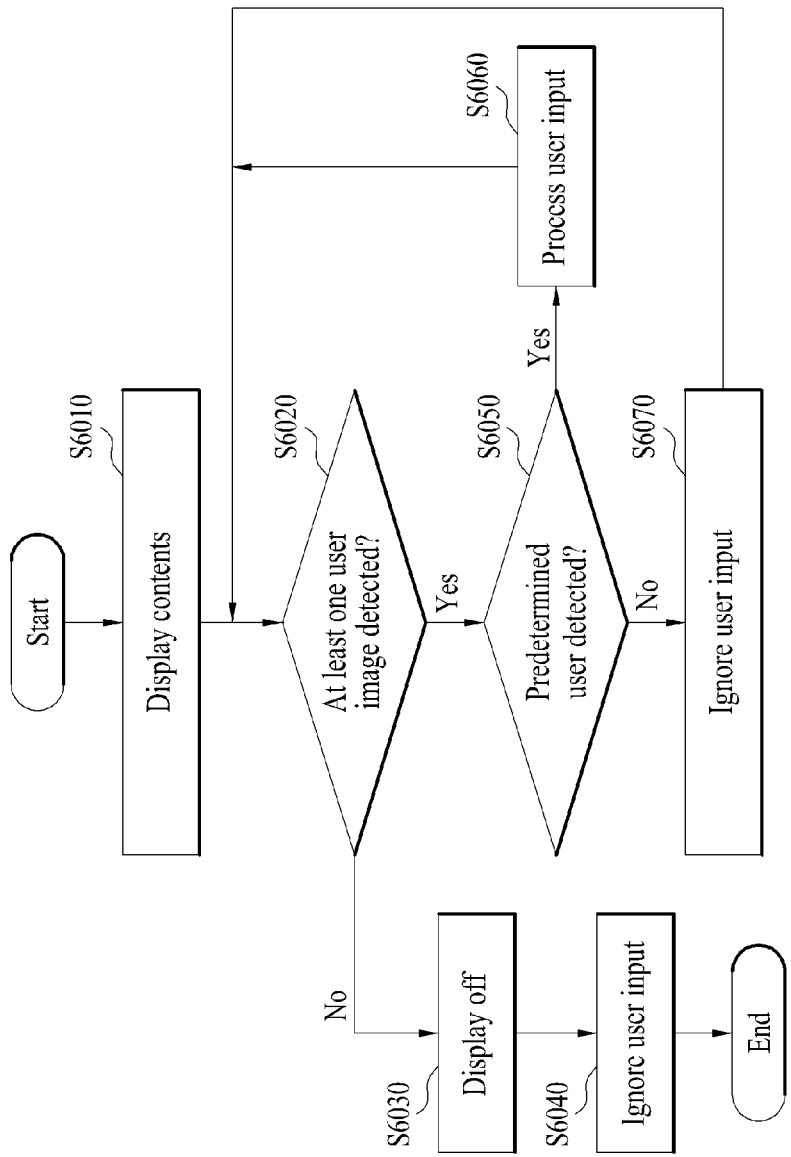
FIG. 6 is a flowchart illustrating a method for controlling a display and a user input of a display device according to an embodiment of the present specification.

FIG. 6 is a flowchart illustrating a method for controlling a display and user input of a display device according to an embodiment of the present specification.

The device may display content (S6010). The content refers to visual information including video, still images, text, images, etc.

The device may detect an image of at least one user (S6020). The device may acquire an image in front of the device using the camera unit at a predetermined interval or when a predetermined event is generated. The device may detect an image of at least one user from the acquired image. The device can acquire an image in front of the device and detect a user image from the acquired image at a predetermined interval. As described above, the predetermined interval may be changed according to device setting or visual information displayed on the device.

When an image of at least one user is not detected, the device may turn off the display (S6030). The device may ignore user input received in this state instead of processing the same (S6040). The device can turn off the display and enter the lock state. In this case, the device ignores the received user input when the received user input is normal user input. When the received user input is user input for cancelling the lock state, the device can process the user input to exit the lock state. In step S6030, the device may turn off the display after a predetermined lapse of time without immediately turning off the display, or return to step S6020 after the predetermined lapse of time, detect a user image one more time and turn off the display when the user image is not detected.

When an image of at least one user is detected, the device may determine whether or not the detected user image corresponds to a predetermined user (S6050). In other words, the device can detect an image of at least one user from the acquired image and process the detected user image to identify the user. The predetermined user may correspond to the above-described master user. When an image of a plurality of users is detected, the device may determine whether or not the master user is included in the plurality of users in step S6050. That is, the device can identify one or more users through the detected image and determine whether or not the predetermined user is among the identified users in step S6050.

The device may process the user input when the detected user corresponds to the predetermined user or the predetermined user is included among the detected users (S6060) and ignore the user input when the detected user does not correspond to the predetermined user or the predetermined user is not included among the detected users (S6070). The above description can be applied to the operation of processing or ignoring the user input.

FIG. 6 is a flowchart illustrating the method of performing the embodiments shown in FIGS. 2 to 5. Accordingly, descriptions of FIGS. 2 to 5 can be applied to FIG. 6. More specifically, the case in which an image of at least one user is not detected in FIG. 6 may correspond to the case in which no user is detected in FIGS. 2 to 5. The case in which an image of at least one user is detected and the detected user image corresponds to the predetermined user in FIG. 6 may correspond to the case in which both the master user and the normal user are detected or only the master user is detected in FIGS. 2 to 5. In addition, the case in which an image of at least one user is detected and the detected user image does not correspond to the predetermined user in FIG. 6 may correspond to the case in which only the normal user is detected in FIGS. 2 to 5.

A description will be given of an embodiment in which user's gaze is used in addition to a user image.

With the development of image processing technology, the device can analyze an image to extract various types of information within a short time. As described above, the device can analyze an image in front thereof to determine whether or not a user is present or to identify a detected user. In addition, the device may additionally detect a point of gaze of the detected user and determine whether or not the point of gaze of the user relative to the device. The display device of the present specification can control a display and user input more accurately according to the intention of the user using user's gaze analysis.

For example, when the device acquires an image in front thereof using the camera unit provided to the front thereof, the device can detect at least one user image from the acquired image. The device can detect a viewing line or viewing direction from the detected user image. Specifically, the device can detect the viewing direction of the user by analyzing the image of the pupils of the user, included in the user image. According to one embodiment, when the user's pupil faces in a predetermined direction or a predetermined area, the device can determine that the user gazes at the device. According to another embodiment, the device may determine that the user gazes at the device when the area of the face of the user in the detected user image exceeds a predetermined range. That is, the device can detect the user image from the image of the front thereof, detect the area of the user face from the detected user image and determine that the user gazes at the device when the area of the user face exceeds a predetermined area.

Information indicating the direction of the pupil, viewing line and viewing direction of a user may be called point of gaze information. Particularly, the point of gaze information may be data that indicates whether or not a detected user gazes at the device. The device can acquire the point of gaze information from the detected user image. When a plurality of users is detected, the device may acquire point of gaze information about each user or one piece of point of gaze information indicating point of gazes of the plurality of users. The device may perform an operation corresponding to the point of gaze information. A method for acquiring point of gaze information may correspond to the above-described method for determining whether or not a user gazes at the display device. The device can represent whether or not a user gazes at the display device as gaze information.

In the present specification, when plural users located in front of the device are detected, the device can perform the above-described method for controlling a display and user input according to whether or not a user watching the device is present and who the user is . . . . Even when a user is located in front of the display device, the user may not use the device. In this case, the device need not maintain display. Furthermore, even if the master user located in front of the device is detected, the master user may not want to process user input of a normal user while the master user does not watch the display.

For example, when both points of gaze of the master user and the normal user are detected, the operation described with reference to FIG. 2 can be performed. However, even when both the master user and the normal user are detected, the operations of FIGS. 3 and 6 may be performed in a different manner according to whether or not each user gazes at the device. For example, even when the master user is detected, the master user may not want to allow the normal user to control the device while the master user does not watch the device. A description will be given of operations of the device according to whether or not user's gaze is detected. Particularly, operations different from those described in FIGS. 2 to 6 will be described in detail. Descriptions of FIGS. 7 and 8 may correspond to operations additionally performed when an image of a user located in front of the device is detected in the operations of the display device, described with reference to FIGS. 2 to 6.

Figure 7:
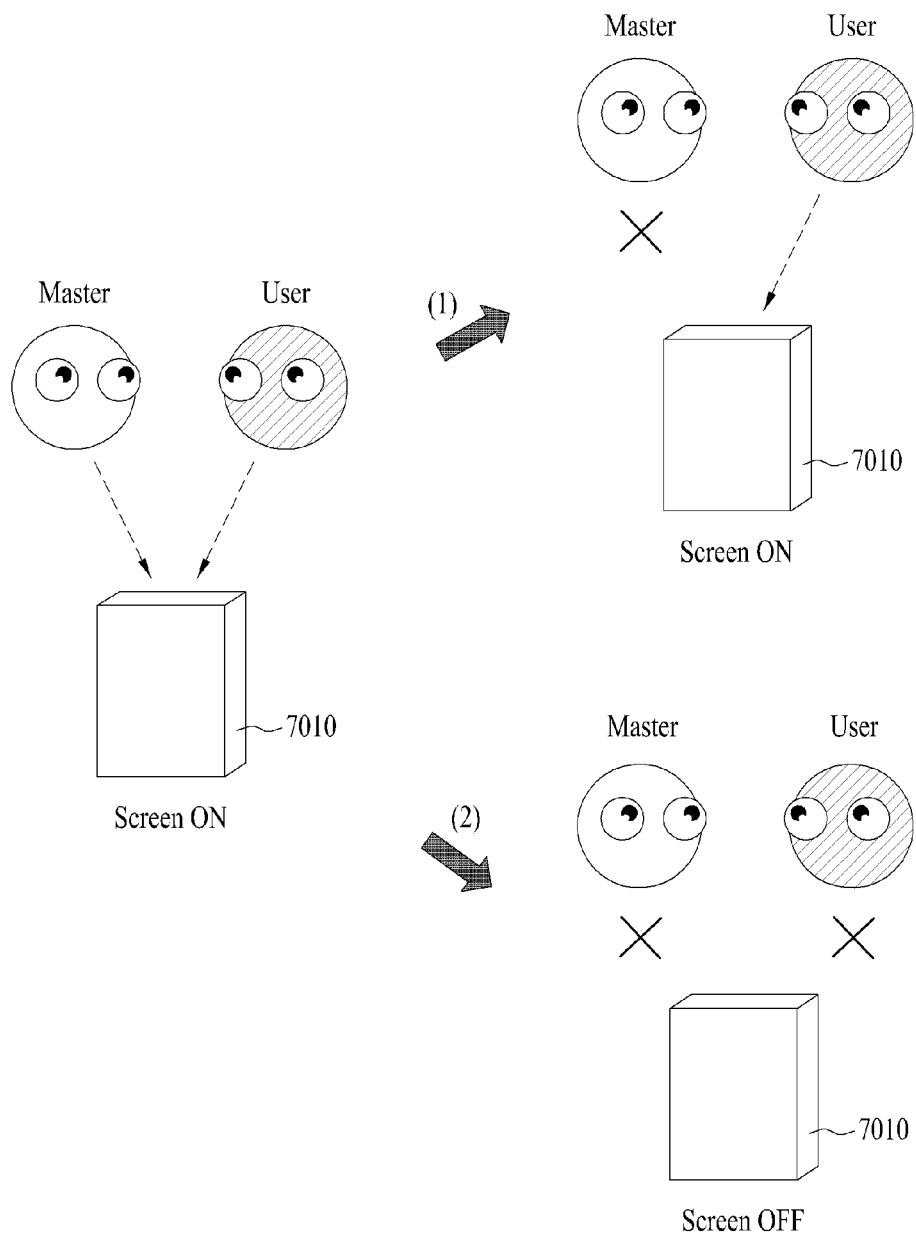
FIG. 7 illustrates a method for controlling a display of a display device according to an embodiment of the present specification.

FIG. 7 illustrates a method for controlling a display of a display device according to an embodiment of the present specification.

FIG. 7 illustrates a method for maintaining a display or turning off the display according to a point of gaze of a user who uses a device 7010. In FIG. 7, an operation of maintaining a display is represented as "screen ON" and an operation of turning off the display is represented as "screen OFF" . . . . In FIG. 7, a dotted arrow indicates a user's gaze. FIG. 7 shows a case in which both the master user and the normal user are detected.

In FIG. 7, (1) shows a case in which only a point of gaze of the normal user located in front of the device is detected and (2) shows a case in which a point of gaze of a user is not detected.

The upper part of the left of FIG. 7 shows a case in which both the master user and the normal user are detected, particularly, a case in which both points of gaze of the master user and the normal user are detected. In this case, the device may maintain the display instead of turning off the display since the master user's gaze is detected. It can be assumed that, after detection of both the points of gaze of the master user and the normal user, the state is changed to the cases (1) and (2) of FIG. 7.

When the point of gaze of the master user located in front of the device is detected, the device can maintain the display instead of turning off the display since the master user is a registered user having permission to use the device.

In FIG. 7, (1) shows a case in which only the point of gaze of the normal user located in front of the device is detected. In the present specification, the device can maintain the display instead of turning off the display even when only the point of gaze of the normal user is detected because there is no problem in security even if the normal user continuously views visual information that has been viewed by the master user and the normal user together when the point of gaze of the master user has been detected.

Even in this case, if the point of gaze of the master user is not detected for a predetermined time or longer or only the point of gaze of the normal user is detected, the device may turn off the display. This is because information that is not predicted by the master user may be displayed after a predetermined time according to type of displayed visual information. The predetermined time may be changed according to device setting or determined according to visual information type. For example, in the case of a video having a long runtime, security is less threatened even when the device displays the video while the master user does not gaze at the device. However, when still images or text is automatically page-turned, security may be threatened if display of the still images or text is maintained. Accordingly, the predetermined time is set to a relatively long period in the case of video having a long runtime and set to a relatively short period in the case of video having a short runtime or sequential display of a plurality of images.

In FIG. 7, (2) shows a case in which a point of gaze of a user located in front of the device is not detected. In this case, the device can turn off the display since the device need not maintain display even when a user is located in front of the device. The device may turn off the display after a predetermined time from when a user's gaze is not detected. Otherwise, the device may detect a user's gaze one more time after a predetermined lapse of time and turn off the display when a user's gaze is not detected.

Figure 8:
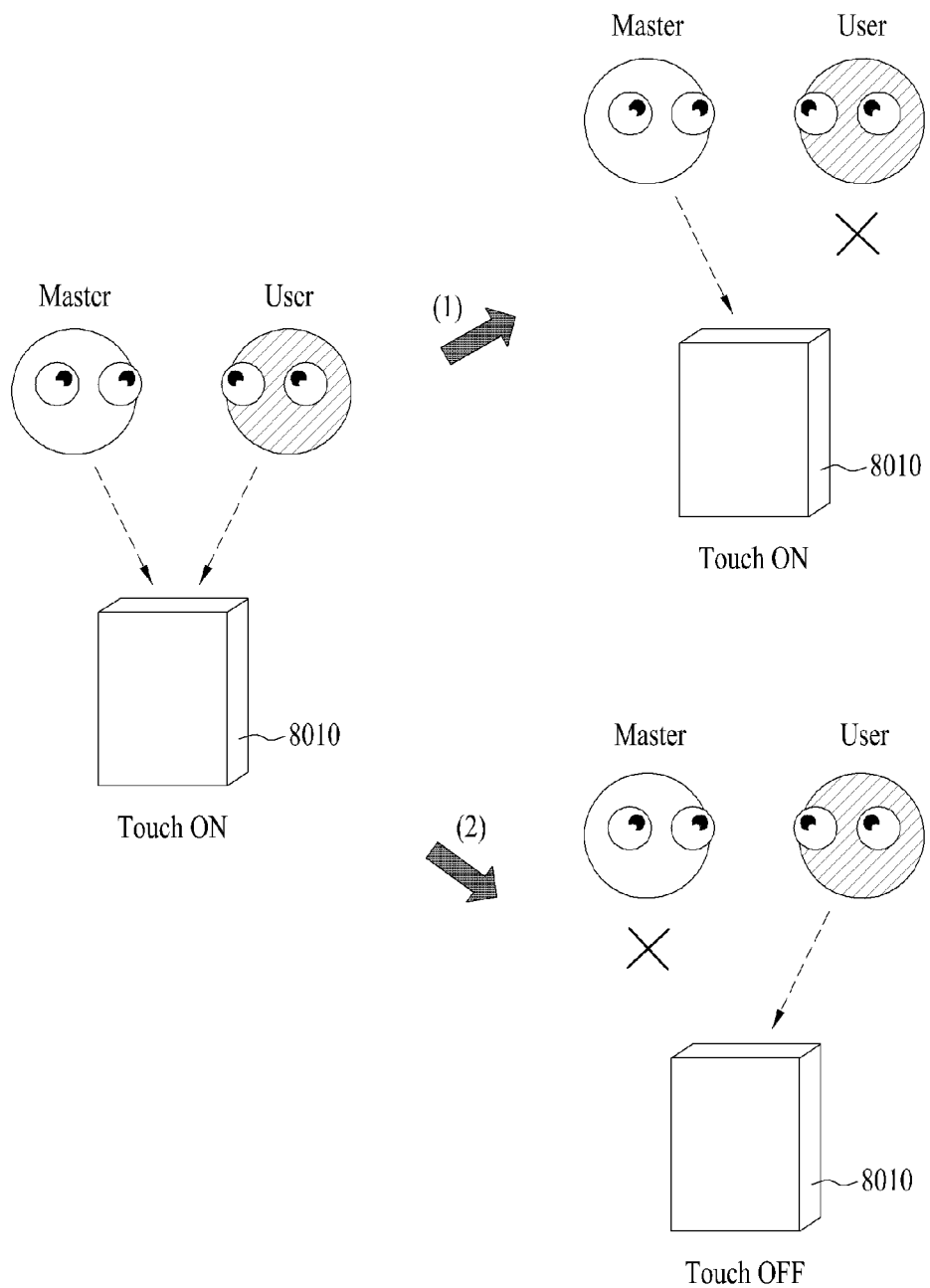
FIG. 8 illustrates a method for controlling a user input of a display device according to an embodiment of the present specification.

FIG. 8 illustrates a method for controlling user input of a display device according to an embodiment of the present specification.

FIG. 8 illustrates a method for processing or ignoring/bypassing user input according to user who uses a device 8010. In FIG. 8, a case in which user input is touch input and is processed is represented as "touch ON" and a case in which the user input is not processed is represented as "touch OFF". In FIG. 8, a dotted arrow indicates a user's gaze. FIG. 8 may show a case in which both the master user and the normal user are detected.

In FIG. 8, (1) shows a case in which only the point of gaze of the master user located in front of the device is detected and (2) shows a case in which only the point of gaze of the normal user located in front of the device is detected.

The upper part of the left of FIG. 8 shows a case in which both the master user and the normal user are detected, particularly, a case in which both the points of gaze of the master user and the normal user are detected. In this case, the device can process received user input and perform an operation according to the user input since the point of gaze of the mater user is detected. It can be assumed that, after detection of both the points of gazes of the master user and the normal user, the state is changed to cases (1) and (2) of FIG. 8.

In FIG. 8, (1) shows a case in which only the point of gaze of the master user located in front of the device is detected. The device can process a received user input and operate according thereto because the master user is a registered user having a permission to use the device as described above with reference to FIG. 4.

In FIG. 8, (2) shows a case in which only the point of gaze of the normal user located in front of the device is detected. In this case, the device may not process the received user input though the master user located in front of the device is detected. This is because permission of the normal user to control the device while the master user does not watch the device may threaten the security of the device although continuous display of visual information that has been viewed by the master user and the normal user together does not pose a serious security threat.

When a point of gaze of a user located in front of the device is not detected, the device may not process the user input as described above with reference to FIG. 4. In this case, the device can determine whether or not to process the user input according to user input type.

When a user located in front of the device is detected but a user's gaze at the device is not detected, the device may turn off the display and enter the lock state. The lock state and the user input processing method in the lock state have been described above.

Figure 9:
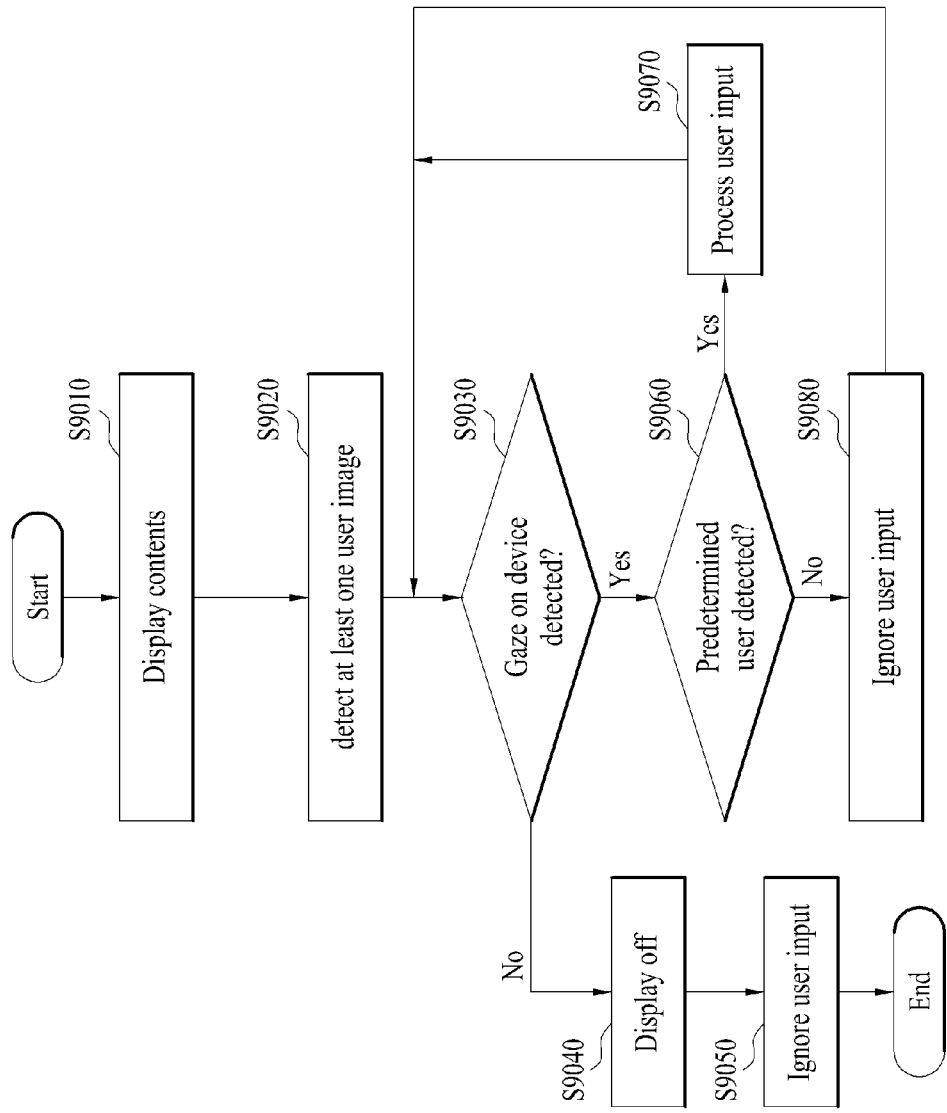
FIG. 9 is a flowchart illustrating a method for controlling a display and a user input of a display device according to another embodiment of the present specification.

FIG. 9 is a flowchart illustrating a method for controlling a display and user input of a display device according to another embodiment of the present specification.

The device may display content (S9010). The content refers to visual information including video, still images, text, images, etc.

The device may detect an image of at least one user (S9020). The device may acquire an image in front of the device using the camera unit at a predetermined interval or when a predetermined event is generated. The device may detect an image of at least one user from the acquired image.

When the image of at least one user is detected, the device may detect a point of gaze at the device (S9030). As described above, the device can analyze the image of the pupil of the detected user to determine whether or not the detected user gazes at the device.

When the point of gaze of at least one user is not detected, the device may turn off a display (S9040). The device may not process user input received in this state and may ignore user input (S9040). The device can turn off the display and enter the lock state. In this case, the device ignores received user input. When the received user input corresponds to user input for cancelling the lock state, the device can process the user input to exit the lock state, as described above. In step S9040, the device may turn off the display after a predetermined lapse of time instead of immediately turning off the display, or return to step S9040 after a predetermined lapse of time, detect a user image one more time and turn off the display when a user image is not detected.

When the point of gaze of at least one user is detected, the device may determine whether or not the user corresponds to a predetermined user (S9060). In other words, the device can detect the point of gaze of at least one user at the device from the acquired image and process the image of the user to identify the user. The predetermined user may correspond to the above-described master user. When a plurality of users and points of gaze of the plurality of users are detected, the device may determine whether or not the master user is included among the plurality of users in step S9060. That is, steps S9020, S9030 and S9060 may be performed together or carried out as one operation. The device can identify one or more users corresponding to detected points of gaze and determine whether or not the predetermined user is included among the identified users in step S9060.

The device may process the user input when the detected user corresponds to the predetermined user (S9070) and ignore user input when the detected user does not correspond to the predetermined user (S9080). The above description can be applied to the operations of processing and ignoring of user input.

Furthermore, the device may detect at least one user image (S9020). When the user image is not detected, the device may turn off the display (S9040), as described above with reference to FIG. 6, and ignore the user input (S9050). In this case, steps S6030 and S6040 of FIG. 6 and descriptions thereof can be applied.

FIG. 9 is a flowchart illustrating the method of performing the embodiments shown in FIGS. 7 and 8. In addition, FIG. 9 illustrates the operation of detecting a user's gaze in addition to the method described with reference to FIGS. 2 to 6. Accordingly, descriptions of FIGS. 2 to 8 can be applied to FIG. 9 . . . . More specifically, the case in which at least one user image is not detected in FIG. 9 may correspond to the case in which no user is detected in FIGS. 2 to 6. The case in which the point of gaze of at least one user is detected and the user corresponds to the predetermined user in FIG. 9 may correspond to the case in which both points of gaze of the master user and the normal user are detected or the gaze of the master user is detected in FIGS. 7 and 8. In addition, the case in which at least one user image is detected and the detected user image does not correspond to the predetermined user in FIG. 9 may correspond to the case in which only the point of gaze of the normal user is detected in FIGS. 7, 8 and 9.

In the present specification, the display device includes various types of devices that include a display unit and can output content to the display unit, such as a TV receiver, a computer, a notebook computer, a cellular phone, a portable device, etc. It should be understood, however, that there is no intent to limit the invention to the particular forms disclosed, but on the contrary, the invention covers all modifications, equivalents, and alternatives falling within the spirit and scope of the invention as defined by the claims.

What is claimed is:

1. A display device, comprising:
a display unit configured to display visual information;
a camera unit configured to capture an image in front of the display device;
a sensor unit configured to sense user input applied to the display device; and
a control unit configured to control the display device,
wherein the control unit is further configured to:
maintain a first display of the visual information and process a first user input when at least one user from the captured image is detected and the detected at least one user includes a predetermined master user,
maintain a second display of the visual information and ignore a second user input when at least one user from the captured image is detected and the detected at least one user does not include the predetermined master user, or
deactivate the display unit when no user is detected in the captured image,
wherein the control unit deactivates the display unit when a period within which the at least one user is detected from the captured image and the detected at least one user does not correspond to the predetermined master user is longer than a first time interval.

2. The display device according to claim 1, wherein, when the at least one user is detected from the captured image, the control unit further detects a point of gaze of the at least one user at the display device.

3. The display device according to claim 2, wherein, when the point of gaze of the at least one user at the display device is not detected, the control unit deactivates the display unit.

4. The display device according to claim 2, wherein, when the point of gaze of the at least one user at the display device is detected, the control unit ignores the second user input if the at least one user does not include the predetermined master user.

5. The display device according to claim 2, wherein the control unit determines that the at least one user gazes at the display device when an area of a face of the at least one user exceeds a predetermined area in detection of the point of gaze of the at least one user at the display device.

6. The display device according to claim 2, wherein the control unit determines whether or not the at least one user gazes at the display device on the basis of a direction of a pupil in the captured image of a face of the at least one user.

7. The display device according to claim 2, wherein the control unit acquires a point of gaze information about the detected at least one user when the at least one user is detected from the captured image.

8. The display device according to claim 7, wherein the point of gaze information indicates whether or not the detected at least one user located in front of the display device gazes at the display device.

9. The display device according to claim 1, wherein the control unit controls the display device to enter a lock state when no user detected in the captured image.

10. The display device according to claim 9, wherein, when the display device is in the lock state, the control unit processes a fourth user input when the fourth user input corresponds to a lock state cancellation input.

11. The display device according to claim 1, wherein the first and second user inputs are related to the first and second of the displayed visual information, respectively.

12. The display device according to claim 1, wherein the first and second user inputs are a touch input applied to the display unit.

13. The display device according to claim 1, wherein the control unit ignores a third user input when no user is detected from the captured image.

14. The display device according to claim 1, wherein the control unit determines whether to process or to ignore a third user input according to a type of the third user input when no user is detected from the captured image.

15. The display device according to claim 1, wherein the capture of the image in front of the display device and the detection of the user from the captured image are performed at a predetermined second time interval.

16. The display device according to claim 15, wherein the predetermined second time interval is varied according to the displayed visual information.

17. The display device according to claim 1, wherein the first time interval is varied according to the displayed visual information.

18. A method for controlling a display and user input of a display device, the method comprising:
displaying visual information; and
detecting at least one user from an image captured in front of the display device, and
maintaining a first display of the visual information and processing a first user input when the at least one user is detected from the captured image and the detected at least one user includes a predetermined master user,
maintaining a second display of the visual information and ignoring a second user input when the at least one user is detected from the captured image and the detected at least one user does not include the predetermined master user, or
deactivating the display unit when no user detected in the captured image,
wherein the method further comprises deactivating the display unit when a period within which the at least one user is detected from the captured image and the detected at least one user does not correspond to the predetermined master user is longer than a time interval.

19. The method according to claim 18, further comprising:
detecting a point of gaze of the at least one user at the display device when the least one user is detected from the captured image; and
deactivating the display unit when the point of gaze of the least one user at the display device is not detected.

* * * * *